United States Patent [19]

Robe

[11] Patent Number: 4,644,437
[45] Date of Patent: Feb. 17, 1987

[54] TELEPHONE SUBSCRIBER LOOP OVERVOLTAGE PROTECTION INTEGRATED CIRCUIT

[75] Inventor: Thomas J. Robe, Basking Ridge, N.J.

[73] Assignee: AT&T Bell Laboratories, Murray Hill, N.J.

[21] Appl. No.: 794,166

[22] Filed: Nov. 1, 1985

[51] Int. Cl.[4] .............................................. H02H 9/04
[52] U.S. Cl. ...................................... 361/56; 361/60; 361/91; 361/119
[58] Field of Search ...................... 361/42, 45, 54, 56, 361/60, 91, 117–119; 179/186, 190

[56] References Cited

U.S. PATENT DOCUMENTS

| 3,771,022 | 11/1973 | Isokawa | 361/56 |
| 3,904,931 | 9/1975 | Leidich | 361/56 |
| 4,106,070 | 8/1978 | Gordon et al. | 361/42 |
| 4,156,263 | 5/1979 | Comerford et al. | 361/42 |
| 4,254,442 | 3/1981 | Dijkmans et al. | 361/56 |
| 4,282,555 | 8/1981 | Suedberg | 361/119 |
| 4,377,832 | 3/1983 | Toney et al. | 361/56 |
| 4,408,248 | 10/1983 | Bulley et al. | 361/91 |
| 4,456,940 | 6/1984 | Hammerberg et al. | 361/56 |
| 4,475,012 | 10/1984 | Coulmance | 179/81 |
| 4,589,047 | 5/1986 | Gaus et al. | 361/42 |

Primary Examiner—A. D. Pellinen
Assistant Examiner—Jeffrey A. Gaffin
Attorney, Agent, or Firm—Wendy W. Koba

[57] ABSTRACT

An overvoltage protection circuit for communications systems for protecting equipment from power crosses on electric utility lines. A timed latch circuit is used to activate a plurality of steering SCR's which crowbar the overvoltage. The utilization of a latch circuit to activate the steering arrangement, instead of the conventional technique of using actual overvoltage line current, allows smaller devices to be used, thus reducing both circuit size and circuit power dissipation.

9 Claims, 3 Drawing Figures

TELEPHONE SUBSCRIBER LOOP OVERVOLTAGE PROTECTION INTEGRATED CIRCUIT

BACKGROUND OF THE INVENTION

1. Field of the Invention

The present invention relates to a telephone subscriber loop overvoltage protection circuit and, more particularly, to an overvoltage protector which is fully integrated and is capable of accommodating overvoltages of, for example, 210–265 V.

2. Description of the Prior Art

Communication lines may carry foreign electrical energy from many sources, for example, lightning strikes and power transmission line faults. In order to safeguard communication equipment connected to such lines, prior protection circuits have included large numbers of discrete components.

More recently, switching or crowbar type protection circuits have been developed which include semiconductor elements. Such circuits, however, may not be adapted to the specialized protection requirements of communication circuits. A communication protector should be resistant to latching due to the constant DC current supplied by a central office. In addition, if foreign voltage appears between one conductor and ground of a two conductor communication line, it is also desirable to provide balanced protection by grounding both conductors. Further, modern construction trends toward out-of-sight equipment installation urge that a protector by physically compact as well.

It is therefore an object of the invention to provide an arrangement affording overvoltage protection for three-wire telephone subscriber loops which is fully integrated and able to perform the desired protection functions.

SUMMARY OF THE INVENTION

The present invention relates to a telephone subscriber loop overvoltage protector circuit and, more particularly, to an overvoltage protector which is fully integrated and is capable of limiting overvoltages to less than 265 volts.

It is an object of the present invention to provide overvoltage protection using a fully integrated circuit which is relatively small in chip size, requiring only four large area components in place of the seven large area components found in conventional prior art arrangements.

A further object of the invention is to reduce the heat dissipation associated with prior art arrangements which experienced regulation at high voltages. In particular, a timed latch configuration is used to hold the crowbar component in the "on" state in the voltage range where the prior arrangements experienced linear feedback and voltage regulation.

Other and further objects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Overvoltage protection circuits are utilized on subscriber telephone loops to protect the user from dangerous high voltage conditions, for example, a power transmission line fault. Such a line fault, referred to as a power cross, occurs when two power company utility lines come in contact with one another and induce a high voltage onto the nearby telephone line.

Figure 1:
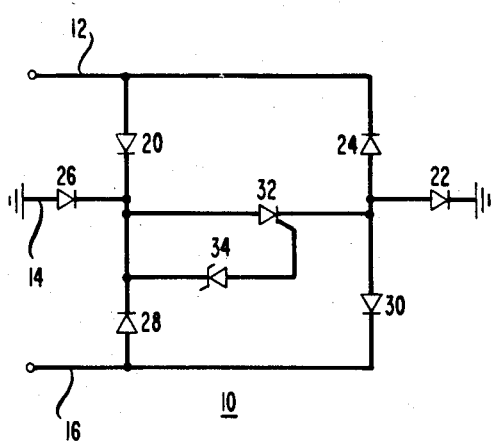
FIG. 1 illustrates a prior art overvoltage protector utilizing discrete components.

A conventional discrete component protection circuit 10 is illustrated in FIG. 1. Circuit 10 provides protection against overvoltages of either polarity occurring between ring lead 12 and ground plane 14, ring lead 16 and ground 14, or tip lead 12 and ring lead 16. In all, six conditions of overvoltage are accommodated. A set of six diodes are used to "steer" the overvoltage-induced current through the system and away from the user. In particular, a positive overvoltage current between ring lead 12 and ground 14 will pass through diodes 20 and 22. A negative overvoltage between these same two leads will be accommodated by diodes 24 and 26. Diodes 28 and 22 will steer a positive overvoltage current between tip lead 16 and ground 14, and the opposite polarity will pass through diodes 30 and 26. A positive overvoltage between tip 12 and ring 16 will be steered through diodes 20 and 30, where the current relates to a negative overvoltage between these two points will pass through diodes 24 and 28. A silicon-controlled recitifier (SCR) 32 is utilized as the main control element to direct the current flow through the plurality of steering diodes where the cathodes of steering diodes 20, 26 and 28 are connected to the anode of SCR 32 and the anodes of steering diodes 22, 24 and 30 are connected to the cathode of SCR 32. A Zener diode 34 is used as the overvoltage threshold sensing device and is connected between the gate and anode of SCR 32. When a voltage of sufficient magnitude is present between any two terminals. Zener diode 34 will breakdown, supplying a gate trigger current $I_{GT}$ to SCR 32. This current is large enough to turn "on" SCR 32, allowing the overvoltage line current to pass through SCR 32 and the appropriate diode pair. SCR 32 is often defined as the element which "crowbars" the overvoltage between the two leads experiencing the overvoltage.

Although this circuit will provide adequate overvoltage protection, there are some disadvantages associated with its use in integrated circuit form. These disadvantages are primarily related to the standard requirements of small chip size, avoidance of latch-up at line currents up to 120 mA, relatively low power dissipation, and a maximum voltage of 265 volts. With respect to the size of protector 10, seven large area components (SCR 32 and steering diodes 20, 22, 24, 26, 28 and 30) are required to conduct the required 1.4 A peak current. These seven components automatically result in a rather large chip size. Additionally, SCR 32 must have a holding current $I_H$ (the minimum current at which the SCR will remain "on") which is greater than 120 mA. This requires that the gate trigger current $I_{GT}$ of SCR 32 be relatively high. Consequently, when the overvoltage source limits current to less than $I_{GT}$, protection circuit 10 will not crowbar, but will regulate at high voltages, leading to very high chip dissipation (on the order of 5 W). Further, if $I_{GT}$ is less than $I_H$, and the line overvoltage source supplies a current $I_L$ between these two, SCR 32 will fire to a low voltage momentarily and then turn off to a high voltage state where it will fire again, and the sequence will be repeated. This cycle of "on" and "off" will thus produce a relatively high frequency-high voltage oscillation, leading to extreme chip dissipation and noise which can couple to nearby lines. Lastly, it is very difficult to integrate a threshold sensing Zener 34 which is sufficiently well-controlled. That is, a Zener diode 34 which takes into account its positive temperature coefficient to assure a threshold range between 210 and 265 volts.

Figure 2:
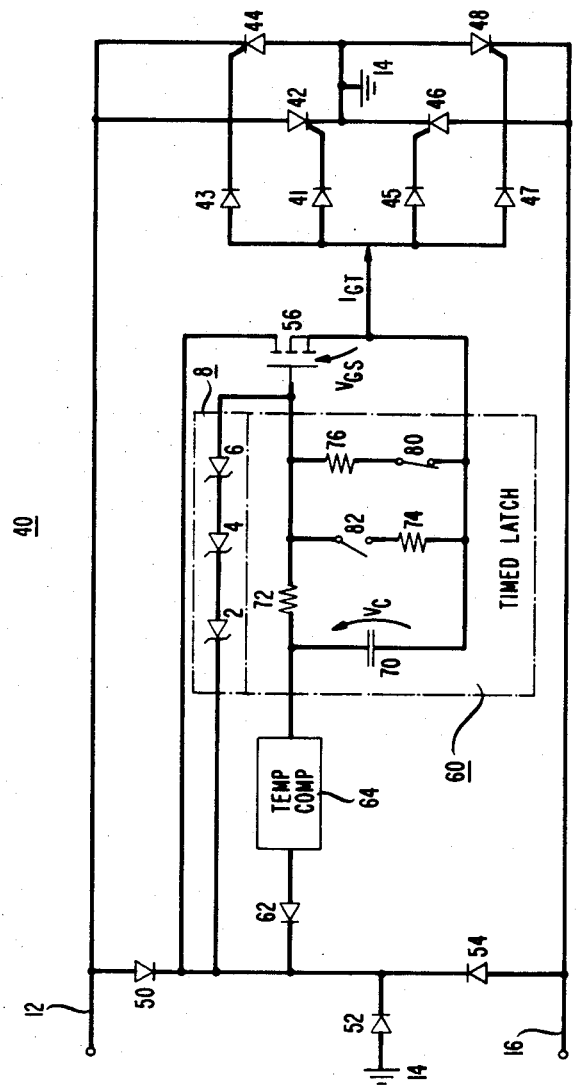
FIG. 2 illustrates, in simplified form, an integrated overvoltage protector formed in accordance with the present invention.

An integrated protection circuit 40 of the present invention, as illustrated in FIG. 2, is capable of solving these and other problems associated with prior art protection arrangements. Referring to FIG. 2, a plurality of four current steering SCRs 42, 44, 46, and 48 and used in place of steering diodes 20, 22, 24, 26, 28, and 30 associated with prior art protection circuit 10. Associated with the plurality of SCRs are a plurality of small area blocking diodes 41, 43, 45 and 47 which are used to direct the flow of the gate trigger current $I_{GT}$. Small area diodes 50, 52, 54 are disposed between tip 12, ground 14, and ring 16 in a manner similar to diodes 20, 26, and 28 of FIG. 1, although diodes 50, 52 and 54 are significantly smaller than those used in the prior art arrangement. The parallel combination of SCR 32 and Zener diode 34 of prior art protector 10 is replaced by a doubly-diffused MOS (DMOS) transistor 56, a timed latch circuit 60, a Zener diode 62, and a temperature compensation circuit 64, connected as shown in FIG. 2 between diodes 50, 52, 54 and SCRs 42, 44, 46 and 48. The current levels passing through Zener diode 62 and temperature compensator 64 are substantially reduced by using DMOS transistor 56 as a buffer between the two diode arrangements. It is to be understood that many other elements may be used in place of DMOS transistor 56, for example, any MOS transistor capable of operating in high voltage switching applications. Appropriate bipolar circuitry may also be used. However, it is believed that a DMOS transistor is the most practical choice. As shown in FIG. 2 the source of DMOS transistor 56 is connected to the gates of steering SCRs 42, 44, 46, and 48 via blocking diodes 41, 43, 45 and 47, respectively. The drain of DMOS transistor 56 is connected to the cathodes of steering diodes 50, 52, and 56, and the gate of DMOS transistor 56 is controlled by timed latch circuit 60. Zener diode 62 and temperature compensation circuit 64 are connected in series between the cathodes of steering diodes 50, 52, 54 and timed latch circuit 60. Temperature compensation circuit 64 may comprise any arrangement well known in the art which compensates for the variations in circuit operation associated with the temperature dependence of Zener diode 62. For the sake of completeness a lightning surge protection circuit 8, comprising a plurality of Zener diodes 2, 4, 6 is also illustrated in FIG. 2. This circuit provides an alternative conduction path between the interconnection of tip 12, ground 14 and ring 16 for large spiked transient voltages related to lightning strikes.

Chip size of protection circuit 40 is substantially reduced as compared with prior art arrangements by using four large area devices (SCRs 42, 44, 46, and 48) and three small diodes (50, 52, and 54), in place of the seven large area components (SCR 32 and diodes 20, 22, 24, 30, 26, 28) as illustrated in FIG. 1. This substitution results from translating the current steering function to gate trigger current levels (on the order of mA), rather than requiring full crowbar current (which may be as great as 1.4 A) to flow through the current steering components. In an integrated circuit, the cost of providing SCR's is similar to that of providing large area diodes, so that the four to seven device trade-off associated with protection circuit 40 of the present invention yields significant cost savings in addition to the saving in actual chip size. The slight penalty paid for using the arrangement of the present invention lies in the requirement to provide twice the gate trigger current level through DMOS transistor 56, rather than a single gate trigger current, as used with SCR 32 in FIG. 1. However, this penalty may be offset by using an SCR design which has a high $I_H/I_{GT}$ ratio, approximately 10:1.

In accordance with the principles of the present invention, timed latch circuit 60 and parallel high voltage crowbar DMOS transistor 56 eliminate the high voltage regulation and high voltage oscillation associated with prior art protection circuit 10 of FIG. 1. Latch circuit 60, in general, comprises a voltage divider network controlled by a pair of switches which regulate the voltage applied between the gate and source of DMOS transistor 56. In particular, latch circuit 60 includes a capacitor 70 connected between temperature compensation circuit 64 and the source of transistor 56. A group of resistive elements 72, 74, and 76 are connected as shown across capacitor 70 and the gate of transistor 56. The value of resistor 74, denoted $R_{74}$, is chosen to be at least an order to magnitude greater than that of resistor 72, denoted $R_{72}$, and the value of resistor 76, $R_{76}$, is chosen to be at least an order of magnitude less than $R_{72}$. A pair of switches 80 and 82 are connected in series with resistors 76 and 74, respectively, to control the resistance ratio seen by the voltage $V_C$ across capacitor 70, and thus the gate-to source voltage $V_{GS}$ of transistor 56. Switches 80 and 82 are appropriately activated to prevent the turn on of DMOS transistor 56 and steering SCR's 42, 44, 46, and 48 until capacitor 70 has charged sufficiently to fully and completely turn on transistor 56 with a gate to source voltage $V_{GS}$ of, for example, approximately 13 volts. Therefore, since $V_{GS}$ of transistor 56 remains in the range of millivolts until brought up to full voltage by the action of switches 80 and 82, the associated steering SCR's cannot operate in the linear feedback mode required for regulation. When fault currents are less than the gate trigger current $I_{GT}$, transistor 56 acts as a crowbar for the line through the gates of SCR's 42, 44, 46 and 48. Alternatively, when the fault line current $I_L$ is between $I_{GT}$ and the holding current $I_H$, transistor 56 shares the crowbar current with SCR's 42, 44, 46, and 48.

In operation, switch 80 of timed latch circuit 60 is normally "on" and switch 82 is normally "off". Therefore, resistors 72 and 76 comprise the voltage divider network between capacitor 70 and DMOS transistor 56. The voltage $V_{GS}$ applied across DMOS transistor 56 is a portion of that appearing across capacitor 70 as shown below in equation (1):

$$V_{GS} = \left( \frac{R_{76}}{R_{76} + R_{72}} \right) \cdot V_C \qquad (1)$$

Since the value of resistor 72 is greater than that of resistor 76 by, for example, two orders of magnitude, the sum of $R_{76}+R_{72}$ is approximately equal to $R_{72}$. Therefore, equation (1) can be rewritten as:

$$V_{GS} \approx \frac{R_{76}}{R_{72}} \cdot V_C. \qquad (2)$$

Since the value of $R_{76}/R_{72}$ is on the order of, for example, 1/100, $V_{GS}$ will be only a small portion of the total voltage $V_C$ across capacitor 70, well below the threshold voltage $V_{th}$ of DMOS transistor 56 and transistor 56 will remain in its "off" state.

When an overvoltage in the range of 210–265 volts occurs, Zener diode 62 will break down and begin to conduct a breakdown current, denoted $I_Z$. This current $I_Z$ passes through temperature compensating circuit 64 and into times latch circuit 60, where it will begin to charge capacitor 70. Switches 80 and 82 are maintained "on" and "off", respectively, during this charging period, thus maintaining the gate voltage at transistor 56 below its threshold value. Once capacitor 70 is charged sufficiently such that the voltage $V_C$ across capacitor 70 is much greater than the threshold voltage $V_{th}$ of DMOS transistor 56 (for example, $V_{th}$ may be 13 V and capacitor 70 may be charged until $V_C$ reaches 14 V), switch 80 turns "off" and switch 82 turns "on". An exemplary circuit arrangement for controlling the operation of switches 80 and 82 will be explained in detail in association with the discussion of FIG. 3. The closing of switch 82 connects large-valued resistor 74 with resistor 72 and capacitor 70, resulting in the coupling of most of the capacitor voltage to the gate of transistor 56. That is, the voltage divider equation becomes $$V_{GS} = \left( \frac{R_{74}}{R_{72} + R_{74}} \right) \cdot V_C, \qquad (3)$$

where $R_{74} \gg R_{72}$. Therefore, $R_{72}+R_{74}$ is approximately equal to $R_{74}$ and equation (3) can be rewritten as $$V_{GS} \approx \frac{R_{74}}{R_{74}} \cdot V_C, \text{ or} \qquad (4)$$

$$V_{GS} \approx V_C.$$

As stated above, the fully charged voltage $V_C$ is chosen to be well above the threshold of transistor 56 and is therefore more than sufficient to fully and completely turn "on" transistor 56, which will then crowbar the overvoltage through the diodes and SCR's of appropriate polarity.

Capacitor 70 discharges through resistors 72 and 74 with a predetermined time constant which is sufficiently long to maintain transistor 56 "on" during the overvoltage condition. When the voltage $V_1$ across the series connection of switch 82 and resistor 74 drops to a predetermined value, for example, 5 volts, switches 80 and 82 again change state, turning transistor 56 "off". Since the threshold voltage of transistor 56 is less than this switching voltage, transistor 56 is precluded from entering a linear mode of operation, thus preventing the line regulation associated with prior art arrangements.

In addition to preventing line regulation, timed latch circuit 60 affords high voltage oscillation suppression by maintaining a large drive voltage to transistor 56 for a sufficient length of time, for example, 20 milliseconds, so that full turn on of SCR 42, 44, 46 or 48 will not deactivate the drive circuitry and allow the line voltage to return to a high voltage condition when the line current falls below $I_H$.

Figure 3:
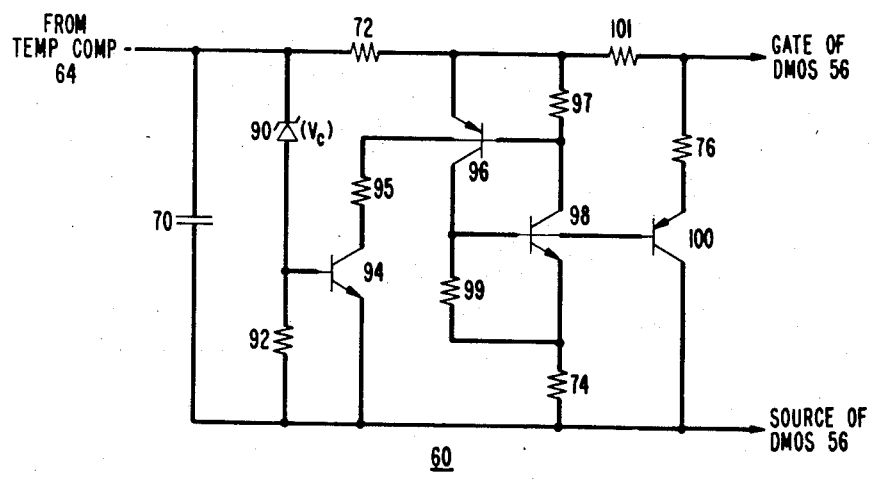
FIG. 3 illustrates in detail an exemplary timed latch circuit used in accordance with the present invention.

An exemplary timed latch circuit 60 formed in accordance with the present invention is illustrated in detail in FIG. 3. As discussed hereinabove in association with FIG. 2, capacitor 70 is connected between temperature compensation circuit 64 and the source of DMOS transistor 56 (not shown) such that the line current $I_Z$ which flows during an overvoltage condition begins to charge capacitor 70. A series connection of a Zener diode 90 and a resistor 92 are connected across capacitor 70 to control the activation of the remainder of timed latch circuit 60, as described later in detail.

Switch 80, as shown in FIG. 3, comprises a pnp transistor 100 connected between resistor 76 and the source of DMOS transistor 56 (not shown), where the emitter of pnp transistor 100 is connected to resistor 76 and the collector of pnp transistor 100 is connected to the source of DMOS transistor 56. In the absence of an overvoltage condition, as described above, switch 80 is in its "closed" position, that is, pnp transistor 100 is biased to be "on". Switch 82 comprises both a pnp transistor 96 and an npn transistor 98, with associated biasing resistors 97 and 99, connected as shown between resistors 72 and 74. In particular, the emitter of pnp transistor 96 is connected to resistor 72, and the base of pnp transistor 96 is connected to both resistor 97 and the collector of npn transistor 98. The collector of pnp transistor 96 is connected to both the base of npn transistor 98 and biasing resistor 99. This particular interconnection of transistors 96 and 98 thus forms a circuit configuration having characteristics like those of a four layer pnpn device, where the signal present at the base of transistor 96 will control signal flow through switch 82 and resistor 74. As described above, under normal operating conditions (i.e., no overvoltage present) switch 82 is "open", that is, transistors 96 and 98 are biased to be "off". Npn transistor 94 and biasing resistor 95 serve as the conduction path between threshold Zener diode 90 and switch 82, where the base of transistor 94 is connected between Zener diode 90 and resistor 92 and the collector of npn transistor 94 is connected via resistor 95 to the base of pnp transistor 96 of switch 82.

When an overvoltage condition exists, as described in association with FIG. 2, Zener breakdown current $I_Z$ enters timed latch circuit 60 and begins to charge capacitor 70. At this point in time, switch 80 is closed and switch 82 is open, maintaining $V_{GS}$ of DMOS 56 well below threshold. When the voltage across capacitor 70 becomes greater than this threshold voltage, timed latch circuit 60 is activated. In particular, Zener diode 90 breaks down since the threshold voltage of Zener diode 90 is chosen to be approximately equal to this predetermined threshold voltage) allowing a switching current, $I_S$, to flow into resistor 92 and the base of npn transistor 94, turning npn transistor 94 "on". Once npn transistor 94 begins to conduct, current will flow into the base of pnp transistor 96 and the collector of npn transistor 98, turning "on" both transistors 96 and 98, thus activating switch 82 to "close".

Since the collector of pnp transistor 96 is also connected to the base of pnp transistor 100, the turning "on" of transistor 96 reduces the base to emitter voltage of transistor 100 to a very low value. This will turn transistor 100 "off", opening switch 80.

As described above, the closing of switch 82 and the opening of switch 80 changes the voltage division associated with resistors 72, 74 and 76 such that most of the voltage $V_C$ across capacitor 70 will be transferred to DMOS transistor 56. Capacitor 70 will begin to discharge through resistors 72 and 74, where the values of capacitor 70 and resistors 72, 74 are chosen to allow the discharge time of capacitor 70 to be sufficiently long, for example, 10 msecs, so as to maintain an adequate drive voltage to DMOS transistor 56. When capacitor 70 has discharged to a value, for example, 5 volts, the current flow through resistors 72 and 74 becomes too low to maintain transistors 96 and 98 "on". Once transistsors 96 and 98 turn "off", pnp transistor 100 will turn "on", that is the positions of switches 82 and 80 return to their initial states and timed latch circuit 60 is prepared for the occurrence of the next power cross overvoltage.

It is to be noted that this described embodiment of timed latch circuit 60 is exemplary only and various modifications, especially in the design and operation of switches 80 and 82, are considered to be within the scope of the present invention.

What is claimed is:

1. In combination with a three-wire communication equipment including a first and a second input terminal and a ground plane terminal, a circuit for protecting said equipment from both positive and negative polarity overvoltages occurring between any combination of said first and second input terminals and said ground plane, said protection circuit comprising
    a plurality of steering diodes (50, 52, 54) each comprising an anode and a cathode, connected between said first and second inputs and said ground plane such that the cathodes of said diodes are connected together at a common terminal;
    a plurality of silicon-controlled recitifiers (SCRs) (42, 44, 46, 48), each SCR comprising an anode, a cathode, and a gate terminal, said plurality of SCRs interconnected between said first and second inputs and said ground plane so as to provide a circuit path for overvoltage-induced currents of positive and negative polarity between any two terminals;
    switching means (56) connected between the diode common terminal and the gate terminals of each SCR of said plurality of SCRs for providing a means for activating separate ones of said plurality of SCRs, wherein selected ones are activated on the basis of the polarity the overvoltage experienced between any pair of the first and second input and ground terminals;
    overvoltage threshold sensing means (62, 64) coupled to said common terminal for providing an activation output signal ($I_Z$) when a voltage applied between any pair of terminals reaches a predetermined overvoltage threshold level; and
    times latching means (60) connected to said switching means and responsive to the activation output signal from said overvoltage threshold sensing means for turning on said switching means when said activation output signal generates in said timed latching means a predetermined switching voltage level ($V_C$), thereby allowing an overvoltage-induced current to flow through an SCR circuit path of appropriate polarity.

2. A protection circuit as defined in claim 1 wherein said timed latching means comprises
    a capacitor (70) connected between said overvoltage threshold sensing means and said switching means such that a voltage $V_C$ is generated across said capacitor which is a function of the activation output signal from said overvoltage threshold sensing means;
    a switched resistor divider network (72, 74, 76, 80, 82) connected across said capacitor for providing a first, low, voltage output signal when configured in a first switch position and a second, high, voltage output signal when configured in a second switch position, said first low voltage output signal being less than the predetermined switching threshold of said switching means and said second high voltage output signal being greater than the predetermined switching threshold of said switching means.

3. A protection circuit as defined in claim 2 wherein the switched divider network of the timed latching means comprises
    a first resistor (72) connected to the interconnection of the capacitor and the overvoltage threshold sensing means;
    a second resistor (74) comprising a resistance value significantly greater than the value of said first resistor;
    a first switch (82) connected in series with said second resistor, the series combination of said second resistor and said first switch being connected between said first resistor and said capacitor;
    a third resistor (76) comprising a resistance value significantly less than the value of said first resistor such that $R_3 < R_1 < R_2$; and
    a second switch (80) connected in series with said third resistor, the series combination of said third resistor and said second switch being connected in parallel with the series combination of said first switch and said second resistor, said first and second switches being controlled such that said first switch is open and said second switch is closed so as to maintain the first, low voltage output signal until the voltage $V_C$ across the capacitor reaches the predetermined switching voltage level wherein said first switch is closed and said second switch is opened so as to allow the majority of the voltage appearing across said capacitor to become the second, high voltage output signal of said timed latching means.

4. A protection circuit as defined in claim 1 wherein said switching means comprises an MOS transistor including a drain terminal, a source terminal, and a gate terminal, the drain of said MOS transistor coupled to the diode common terminal and the source coupled to the interconnected gate terminals of the plurality of SCRs, the timed latching means being connected between said gate and source terminals such that the output from said timed latching means is applied as the gate to source voltage to said MOS transistor.

5. A protection circuit as defined in claim 4 wherein the MOS transistor comprises a doubly-diffused MOS (DMOS) transistor.

6. A protection circuit as defined in claim 1 wherein the overvoltage threshold sensing means comprises a Zener diode and temperature compensation circuit connected in series between the diode common terminal and timed latching means.

7. A protection circuit as defined in claim 1 wherein the plurality of SCRs comprises
- a first SCR (42) having its anode connected to the first input terminal and its cathode connected to ground;
- a second SCR (44) having its cathode connected to said first input terminal and its cathode connected to ground;
- a third SCR (46) having its anode connected to the second input terminal and its cathode connected to ground; and
- a fourth SCR (48) having its cathode connected to said second input terminal and its anode connected to ground.

8. A protection circuit as defined in claim 1 for use with telecommunications equipment wherein said first input terminal is defined as a tip lead input terminal and the second input terminal is defined as a ring lead input terminal.

9. A protection circuit as defined in claim 8 wherein the overvoltage threshold sensing means provides the activation output signal when a voltage in the range of 210 volts to 265 volts, of either polarity, is applied between any pair of the tip, ring, and the ground terminals.

* * * * *